(12) United States Patent
Matsumoto (10) Patent No.: US 9,306,453 B2
(45) Date of Patent: Apr. 5, 2016

(54) DC/DC CONVERTER AND AN IMAGE FORMING APPARATUS TO WHICH A POWER IS SUPPLIED FROM THE DC/DC CONVERTER

(71) Applicant: CANON KABUSHIKI KAISHA, Tokyo (JP)

(72) Inventor: Shinichiro Matsumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/610,413

(22) Filed: Jan. 30, 2015

(65) Prior Publication Data
US 2015/0229209 A1    Aug. 13, 2015

(30) Foreign Application Priority Data
Feb. 7, 2014    (JP) .................. 2014-022545

(51) Int. Cl.
*G05F 1/00* (2006.01)
*H02M 3/156* (2006.01)
*G03G 15/00* (2006.01)
*H02M 3/158* (2006.01)
*H02M 1/00* (2007.01)

(52) U.S. Cl.
CPC .............. *H02M 3/156* (2013.01); *G03G 15/80* (2013.01); *H02M 3/158* (2013.01); *H02M 2001/0025* (2013.01)

(58) Field of Classification Search
CPC ... H02M 3/155; H02M 3/156; H02M 3/1563; H02M 3/157; H02M 3/158; H02M 2003/1552

USPC .......... 323/234, 237, 265, 273–275, 282–287
See application file for complete search history.

(56) References Cited

U.S. PATENT DOCUMENTS

| | | | |
|---|---|---|---|
| 5,101,252 A | 3/1992 | Matsumoto | |
| 5,508,606 A * | 4/1996 | Ryczek | ..................... 324/117 R |
| 7,355,864 B2 | 4/2008 | Matsumoto | |
| 7,564,695 B2 | 7/2009 | Matsumoto | |
| 7,577,004 B2 | 8/2009 | Matsumoto | |
| 7,595,546 B2 | 9/2009 | Matsumoto | |

(Continued)

FOREIGN PATENT DOCUMENTS

| | | |
|---|---|---|
| JP | 2005-341712 A | 12/2005 |
| JP | 2005-348579 A | 12/2005 |

(Continued)

OTHER PUBLICATIONS

U.S. Appl. No. 14/404,949, filed Dec. 1, 2014. Inventor: Matsumoto.

*Primary Examiner* — Jeffrey Gblende
(74) *Attorney, Agent, or Firm* — Fitzpatrick, Cella, Harper & Scinto (57) ABSTRACT

The power supply apparatus includes a switching element, a voltage output unit configured to generate a DC voltage by a switching operation of the switching element and output the generated DC voltage, a voltage correction unit configured to detect the output voltage and correct the detected voltage, a control unit configured to control operation of the switching element based on the corrected voltage and a threshold voltage, and a voltage increasing unit configured to increase a correction amount by the correction unit based on the operation of the switching element.

12 Claims, 9 Drawing Sheets

(56) References Cited

U.S. PATENT DOCUMENTS

| | | |
|---|---|---|
| 8,428,155 B2 | 4/2013 | Matsumoto |
| 8,903,263 B2 | 12/2014 | Matsumoto |
| 2005/0001564 A1* | 1/2005 | Pan ................................ 315/291 |
| 2007/0057649 A1* | 3/2007 | Yang .............................. 323/222 |
| 2012/0195620 A1* | 8/2012 | Matsumoto ..................... 399/88 |
| 2013/0121036 A1* | 5/2013 | Peng et al. ................. 363/21.02 |
| 2013/0148998 A1* | 6/2013 | Shimura ......................... 399/88 |
| 2013/0272742 A1 | 10/2013 | Matsumoto et al. |
| 2013/0300392 A1* | 11/2013 | Laur et al. ..................... 323/284 |
| 2014/0301114 A1 | 10/2014 | Matsumoto |

FOREIGN PATENT DOCUMENTS

| | | |
|---|---|---|
| JP | 3729630 B | 12/2005 |
| JP | 2013-219983 A | 10/2013 |

* cited by examiner

DC/DC CONVERTER AND AN IMAGE FORMING APPARATUS TO WHICH A POWER IS SUPPLIED FROM THE DC/DC CONVERTER

BACKGROUND OF THE INVENTION

1. Field of the Invention

The present invention relates to a power supply apparatus and an image forming apparatus, and more particularly, to a DC/DC converter.

2. Description of the Related Art

Figure 7:
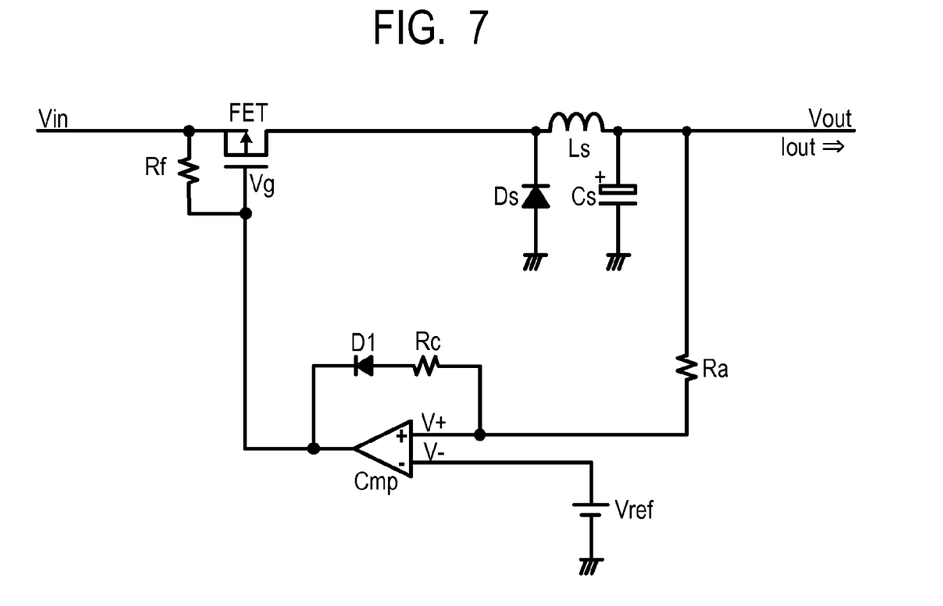
FIG. 7 illustrates a power supply apparatus according to the related art.

As disclosed in Japanese Patent Application Laid-Open No. 2013-219983, a DC/DC converter like that illustrated in FIG. 7 is an example of a related-art power supply apparatus. When an input voltage Vin is supplied to a switching element such as a field effect transistor (hereinafter referred to simply as "FET"), and the FET performs a switching operation, a pulse voltage is supplied to an inductor Ls. The pulse voltage supplied to the inductor Ls is converted into a DC voltage by the inductor Ls, a diode Ds, and a capacitor Cs, and an output voltage Vout is generated. FIGS. 8A to 8D illustrate operating waveforms of the DC/DC converter illustrated in FIG. 7. An on time $t_{on}$ and an off time $t_{off}$ of the FET of the DC/DC converter are represented by the following expression.

$$t_{on} \cong \sqrt{\frac{2 \cdot L_s \cdot C_s \cdot \Delta V_1}{V_{in} - V_{ref}}}$$

$$t_{off} \cong \sqrt{\frac{2 \cdot L_s \cdot C_s \cdot \Delta V_2}{V_{ref}}}$$

Here, $\Delta V1$ represents an increase in the voltage of a V+ terminal of a comparator Cmp by a positive feedback resistor Rc, and $\Delta V2$ represents a decrease in the voltage of a V− terminal of the comparator Cmp by the positive feedback resistor Rc. In the following, $\Delta V1$ and $\Delta V2$ are referred to as threshold voltage change amounts of the comparator Cmp. Further, the details of FIG. 7 are described below.

A switching period Is and a switching frequency fs of the FET of the above-mentioned DC/DC converter are represented by the following expression using the above-mentioned on time $t_{on}$ and off time $t_{off}$ of the FET.

$$T_s \cong t_{on} + t_{off} \cong \sqrt{\frac{2 \cdot L_s \cdot C_s \cdot \Delta V_1}{V_{in} - V_{ref}}} + \sqrt{\frac{2 \cdot V_s \cdot C_s \cdot \Delta V_2}{V_{ref}}}$$

$$f_s \cong \frac{1}{t_{on} + t_{off}}$$

Typically, a larger switching frequency fs enables the size of the inductor Ls and the capacitor Cs used by the DC/DC converter to be reduced. Therefore, increasing the switching frequency fs of the DC/DC converter is known to contribute to reducing costs and the size of the apparatus in which the DC/DC converter is mounted. The switching frequency fs can be increased by setting the threshold voltage change amounts $\Delta V1$ and $\Delta V2$ of the comparator Cmp to smaller values based on the expressions of the switching period Is and the switching frequency fs of the FET.

Figure 9A:
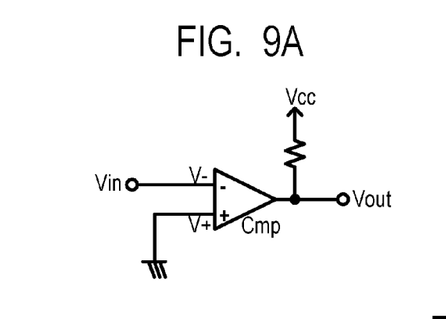
FIGS. 9A, 9B, and 9C illustrate delay times of a converter in the power supply apparatus according to the related art.
Figure 9B:
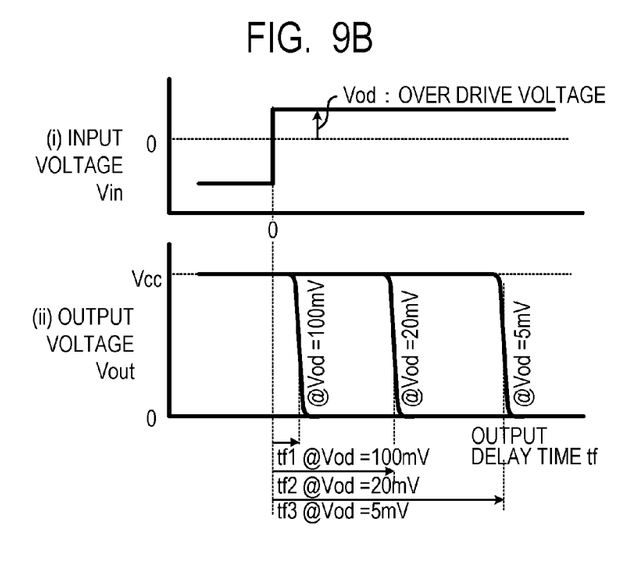
Figure 9C:
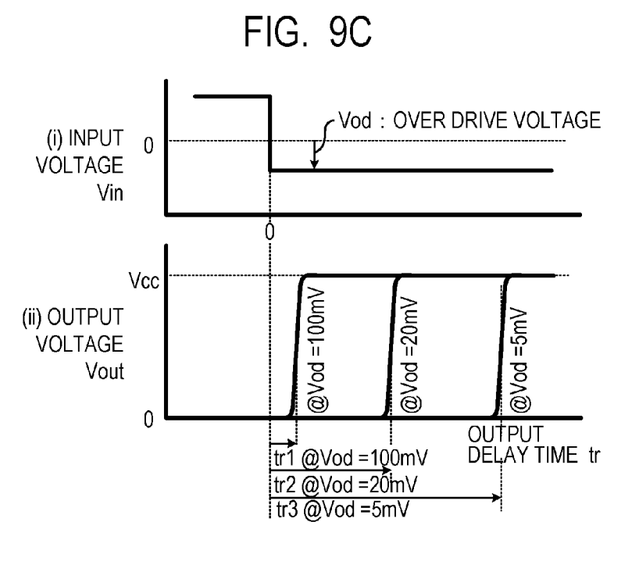

However, it is known that delay times tr and tf of an output signal with respect to an input signal of the comparator Cmp after the input voltage Vin has been input change based on an overdrive voltage Vod of the comparator Cmp. FIGS. 9A to 9C illustrate the response characteristics of a typical comparator. Note that, the details of FIGS. 9A to 9C are described below. As illustrated in FIGS. 9A to 9C, the output delay times tr and tf shorten when the overdrive voltage Vod is large, and conversely lengthen when the overdrive voltage Vod is small.

In the related-art DC/DC converter illustrated in FIG. 7, the threshold voltage change amounts $\Delta V1$ and $\Delta V2$ of the comparator Cmp correspond to the overdrive voltage Vod. As described above, the switching frequency fs can be increased by setting the threshold voltage change amounts $\Delta V1$ and $\Delta V2$ of the comparator Cmp to smaller values. However, when the response characteristics of the comparator Cmp are considered, setting the threshold voltage change amounts $\Delta V1$ and $\Delta V2$ of the comparator Cmp to smaller values in order to increase the switching frequency fs results in the overdrive voltage Vod decreasing. Further, as illustrated in FIGS. 9A to 9C, when the overdrive voltage Vod decreases, the output delay times tr and tf lengthen, and the switching frequency fs decreases. Thus, there has been a limit to how much the switching frequency fs in a power supply apparatus can be increased. Further, as described above, when the switching frequency fs cannot be increased, reduction in the size and costs of the inductor Ls and the capacitor Cs is inhibited.

SUMMARY OF THE INVENTION

The present invention has been made in view of the above-mentioned circumstances, and has an object to increase a switching frequency of a power supply apparatus and reduce the size and costs of the apparatus.

In order to solve the above-mentioned problems, a purpose of the present invention is to provide a power supply apparatus including a switching element configured to input a first DC voltage, a voltage output unit configured to convert a voltage generated by a switching operation of the switching element into a second DC voltage different to the first DC voltage and output the converted second DC voltage, a detection unit configured to detect the second DC voltage, a voltage correction unit configured to correct the second DC voltage detected by the detection unit, a control unit configured to control operation of the switching element based on the second DC voltage corrected by the correction unit and a threshold voltage, and a voltage increasing unit configured to increase a correction amount by the correction unit.

Another purpose of the present invention is to provide an image forming apparatus including an image forming unit, a control unit configured to control operation of the image forming unit, and a power supply configured to supply power to the control unit, the power supply including a switching element configured to input a first DC voltage, a voltage output unit configured to convert a voltage generated by a switching operation of the switching element into a second DC voltage different to the first DC voltage and output the converted second DC voltage, a detection unit configured to detect the second DC voltage, a voltage correction unit configured to correct the second DC voltage detected by the detection unit, a control unit configured to control operation of the switching element based on the second DC voltage corrected by the correction unit and a threshold voltage, and a voltage increasing unit configured to increase a correction amount by the correction unit.

Further features of the present invention will become apparent from the following description of exemplary embodiments with reference to the attached drawings.

DESCRIPTION OF THE EMBODIMENTS

Modes for carrying out the present invention are described below in detail based on embodiments with reference to the drawings. Further, the configuration of a related-art power supply apparatus is described for comparison with the embodiments described below.

[Related-Art Power Supply Apparatus]

FIG. 7 illustrates a DC/DC converter, which is a related-art power supply apparatus. When an input voltage Vin is supplied to a switching element, such as a field effect transistor (hereinafter referred to simply as "FET") to drive the FET and perform an on or off operation (hereinafter referred to as "switching operation"), a pulse voltage is supplied to an inductor Ls. The pulse voltage supplied to the inductor Ls is converted into a DC voltage by the inductor Ls, a diode Ds, and a capacitor Cs, and the DC voltage is output as an output voltage Vout. The output voltage Vout is supplied to a V+ terminal, which is a non-inverted input terminal of a comparator Cmp, via a detection resistor Ra configured to detect the output voltage Vout. The V+ terminal of the comparator Cmp is connected to an output terminal of the comparator Cmp via a positive feedback resistor Rc and a diode D1. Here, the comparator Cmp is a comparison unit configured to compare a detection voltage input to the V+ terminal and a reference voltage input to a V− terminal. The comparator Cmp configures a Schmidt trigger circuit by connecting with the positive feedback resistor Rc between the V+ terminal and the output terminal.

The direction in which the diode D1 is connected is the direction in which the cathode side connects to the output terminal of the comparator Cmp. Further, the anode side of the diode D1 is connected to one end of the positive feedback resistor Rc. The other end of the positive feedback resistor Rc is connected to the V+ terminal of the comparator Cmp. The voltage output from the output terminal of the comparator Cmp is supplied to a gate terminal Vg, which is a control terminal of the FET. Further, an output from the comparator Cmp is pulled up to the input voltage Vin by a resistor Rf. On the other hand, a reference voltage Vref is supplied to the V− terminal, which is an inverted input terminal of the comparator Cmp. The reference voltage Vref is set to roughly the same value as a predetermined voltage so that the output voltage Vout of the DC/DC converter is at a target predetermined voltage.

[DC/DC Converter Operation]

Figure 8A:
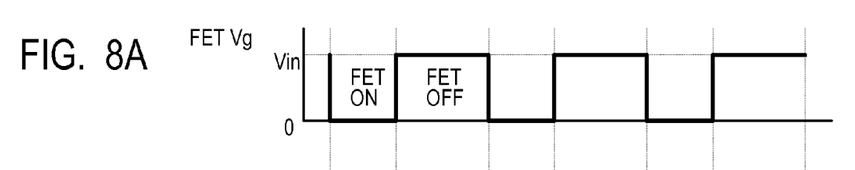
FIGS. 8A, 8B, 8C and 8D illustrate operating waveforms of the power supply apparatus according to the related art.
Figure 8B:
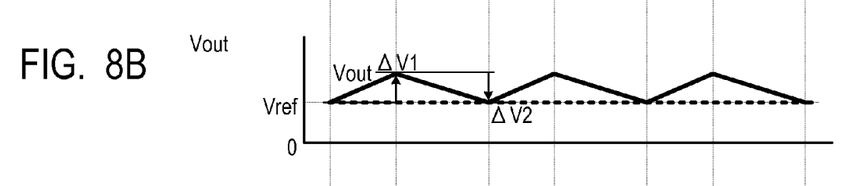
Figure 8C:
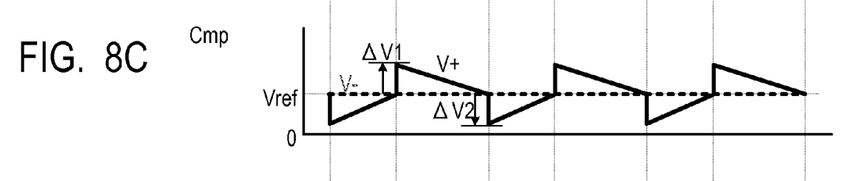
Figure 8D:
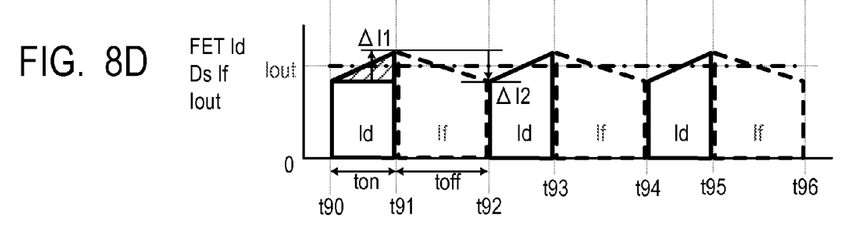

FIGS. 8A to 8D illustrate operating waveforms of the DC/DC converter illustrated in FIG. 7. FIG. 8A illustrates the voltage of the gate terminal Vg of the FET. FIG. 8B illustrates the output voltage Vout of the DC/DC converter. FIG. 8C illustrates the voltage of the V+ terminal (solid line) and the voltage of the V− terminal (dotted line) of the comparator Cmp, respectively. FIG. 8D illustrates a drain current Id (solid line) of the FET, a regeneration current If (dotted line) of the diode Ds, and an output current Iout (dashed-dotted line) of the DC/DC converter. In each case, the horizontal axis represents time. As illustrated in FIG. 8D, the DC/DC converter illustrated in FIG. 7 is configured as a continuous current type DC/DC converter.

When the FET switches on at time t90 (indicated as FET ON in FIG. 8A), the drain voltage of the FET is at about the input voltage Vin, and the drain current Id flows. When the drain current flows, the output voltage Vout increases. When the output voltage Vout increases, the voltage of the V+ terminal of the comparator Cmp also increases with the increase in the output voltage Vout. When the voltage of the V+ terminal of the comparator Cmp reaches the reference voltage Vref, the output of the comparator Cmp has a high impedance. As described above, because the output of the comparator Cmp is pulled up by the resistor Rf, the FET switches off (indicated as FET OFF in FIG. 8A) (time t91).

When the FET switches off, the drain current Id that had been flowing until that point along the route input voltage Vin→FET→inductor Ls stops flowing. When the drain current Id stops flowing, the inductor Ls draws the regeneration current If from the diode Ds side. The regeneration current If flows along the route ground (hereinafter referred to as GND)→diode Ds→inductor Ls. Further, when the output of the comparator Cmp has a high impedance at time t91, a voltage in the reverse direction is applied to the diode D1. Therefore, the current that had been flowing until time t91 along the route output voltage Vout→detection resistor Ra→positive feedback resistor Rc→diode D1→output terminal (low level) of the comparator Cmp stops. Consequently, the voltage of the V+ terminal of the comparator Cmp increases by ΔV1 from the reference voltage Vref. ΔV1 is the increase in the voltage of the V+ terminal by the positive feedback resistor Rc (i.e., the Schmidt trigger circuit). Here, ΔV1 is roughly represented by Expression (1).

$$\Delta V_1 \cong \frac{V_{out}}{R_a + R_c} \cdot R_a \quad (1)$$

In addition, based on the approximation in Expression (2), ΔV1 is roughly represented by Expression (3).

$$V_{out} \cong V_{ref} \quad (2)$$

$$\Delta V_1 \cong \frac{V_{ref}}{R_a + R_c} \cdot R_a \quad (3)$$

When the voltage of the V+ terminal of the comparator Cmp increases from the reference voltage Vref by ΔV1, the output of the comparator Cmp keeps a high impedance, and the FET maintains an off state. When the FET maintains an off state, the voltage of the output voltage Vout decreases.

When the voltage of the output voltage Vout decreases, the voltage of the V+ terminal of the comparator Cmp also decreases with the decrease in the output voltage Vout. When the voltage of the V+ terminal of the comparator Cmp decreases and reaches the reference voltage Vref at time t92, the output of the comparator Cmp is at a low level, and the FET switches on again. When the FET switches on, a voltage is applied in the forward direction to the diode D1, and a current flows along the route output voltage Vout→detection resistor Ra→positive feedback resistor Rc→diode D1→output terminal (low level) of the comparator Cmp. Consequently, the voltage of the V+ terminal of the comparator Cmp decreases from the reference voltage Vref by ΔV2. ΔV2 is the decrease in the voltage of the V+ terminal by the positive feedback resistor Rc. ΔV2 is roughly represented by Expression (4).

$$\Delta V_2 \cong \frac{V_{out}}{R_a + R_c} \cdot R_a \qquad (4)$$

In addition, based on the approximation in Expression (2), ΔV2 is roughly represented by Expression (5).

$$\Delta V_2 \cong \frac{V_{ref}}{R_a + R_c} \cdot R_a \qquad (5)$$

In other words, Expression (6) holds from Expressions (3) and (5).

$$\Delta V_2 \cong \frac{V_{ref}}{R_a + R_c} \cdot R_a \qquad (5)$$

Thus, by connecting the diode D1 to the positive feedback resistor Rc, the DC/DC converter can stably perform a continuous current operation in such a manner that ΔV1 and ΔV2 do not depend on the input voltage Vin. Note that, ΔV1 and ΔV2 refer to the threshold voltage change amounts of the comparator Cmp.

$$\Delta V_1 \cong \Delta V_2 \cong \frac{V_{ref}}{R_a + R_c} \cdot R_a \qquad (6)$$

When the voltage of the V+ terminal of the comparator Cmp decreases from the reference voltage Vref by ΔV2, the output of the comparator Cmp keeps a low level, and the FET maintains an on state. When the FET is switched on, the drain voltage of the FET is at about the input voltage Vin, and the drain current Id flows. When the drain current flows, the output voltage Vout increases. When the output voltage Vout increases, the voltage of the V+ terminal of the comparator Cmp also increases with the increase in the output voltage Vout. After time t92, the DC/DC converter continues the switching operation by repeating the above-described operations of time t90 to time t92. Thus, the positive feedback resistor Rc has a function of correcting the detection voltage detected by the detection resistor Ra, and therefore functions as a correction unit. In the above-mentioned operations, the parameters involved with the on and off timing of the FET are the threshold voltage change amounts ΔV1 and ΔV2 of the comparator Cmp produced by the Schmidt trigger circuit. Therefore, based on Expression (6), ΔV1 and ΔV2 are determined based on the values of basically the reference voltage Vref, the detection resistor Ra, and the positive feedback resistor Rc.

Next, the on time $t_{on}$ of the FET, which corresponds to the period from time t90 to time t91, is determined. The threshold voltage change amounts ΔV1 and ΔV2 of the comparator Cmp are roughly equal to the amplitude of the ripple voltage of the output voltage Vout (see FIG. 8B). When a charge amount stored in the capacitor Cs during the on time $t_{on}$ of the FET (t90 to t91) is Qon, the charge amount Qon is roughly represented by Expression (7) using ΔV1.

$$Q_{on} \cong C_s \cdot \Delta V_1 \qquad (7)$$

Further, when an increase in the drain current Id during the on time $t_{on}$ of the FET (t90 to t91) is ΔI1, the charge amount Qon stored in the capacitor Cs is equal to the area of the hatched portion (triangular shape) in FIG. 8D. Therefore, the charge amount Qon is roughly represented by Expression (8) using the increase ΔI1 in the drain current Id.

$$Q_{on} \cong \frac{1}{2} \cdot \Delta I_1 \cdot t_{on} \qquad (8)$$

In addition, the relationship of Expression (9) roughly holds among the input voltage Vin, the output voltage Vout, the on time $t_{on}$ of the FET, the inductance Ls, and the increase ΔI1 in the drain current Id.

$$V_{in} - V_{out} \cong L_s \cdot \frac{\Delta I_1}{t_{on}} \qquad (9)$$

Therefore, based on Expressions (2), (7), (8), and (9), the on time $t_{on}$ of the FET is roughly represented by Expression (10).

$$t_{on} \cong \sqrt{\frac{2 \cdot L_s \cdot C_s \cdot \Delta V_1}{V_{in} - V_{ref}}} \qquad (10)$$

Further, the off time $t_{off}$ of the FET, which corresponds to the period from time t91 to time t92, is determined. When a charge amount discharged from the capacitor Cs during the off time $t_{off}$ of the FET (t91 to t92) is Qoff, the charge amount Qoff is roughly represented by Expression (11) using ΔV2.

$$Q_{off} \cong C_s \cdot \Delta V_2 \qquad (11)$$

In addition, when a decrease in the regeneration current If of the diode Ds during the off time $t_{off}$ of the FET (t91 to t92) is ΔI2, similar to Expression (8), the charge amount Qoff is roughly represented by Expression (12) using the decrease ΔI2.

$$Q_{off} \cong \frac{1}{2} \cdot \Delta I_2 \cdot t_{off} \qquad (12)$$

In addition, the relationship of Expression (13) roughly holds among the output voltage Vout, the off time $t_{off}$ of the FET, the inductance Ls, and the decrease ΔI2 in the regeneration current If of the diode Ds.

$$V_{out} \cong L_s \cdot \frac{\Delta I_2}{t_{off}} \quad (13)$$

Therefore, based on Expressions (2), (11), (12), and (13), the off time $t_{off}$ of the FET is roughly represented by Expression (14).

$$t_{off} \cong \sqrt{\frac{2 \cdot L_s \cdot C_s \cdot \Delta V_2}{V_{ref}}} \quad (14)$$

Further, the switching period Ts and the switching frequency fs of the FET of the DC/DC converter are roughly represented by Expressions (15) and (16) using the on time $t_{on}$ and the off time $t_{off}$.

$$T_s \cong t_{on} + t_{off} \cong \sqrt{\frac{2 \cdot L_s \cdot C_s \cdot \Delta V_1}{V_{in} - V_{ref}}} + \sqrt{\frac{2 \cdot L_s \cdot C_s \cdot \Delta V_2}{V_{ref}}} \quad (15)$$

As described above, a larger switching frequency fs enables the size of the inductor Ls and the capacitor Cs used by the DC/DC converter to be reduced. Therefore, increasing the switching frequency fs is known to contribute to reducing costs and the size of the apparatus in which the DC/DC converter is mounted. The switching frequency fs can be increased by setting the threshold voltage change amounts $\Delta V_1$ and $\Delta V_2$ of the comparator Cmp to smaller values based on Expressions (15) and (16).

$$f_s \cong \frac{1}{t_{on} + t_{off}} \quad (16)$$

[Comparator Response Characteristics]

The delay time of the output signal with respect to the input signal of the comparator Cmp after the input voltage Vin has been input changes based on the overdrive voltage Vod of the comparator Cmp. Here, the term overdrive voltage Vod refers to the potential difference between an inverted input terminal (V− terminal) and a non-inverted input terminal (V+ terminal) of the comparator Cmp. FIGS. 9A, 9B and 9C illustrate the response characteristics of a typical comparator. FIG. 9A illustrates the correspondence of the respective reference symbols with the comparator Cmp. Part (i) in FIG. 9B shows the input voltage Vin, and part (ii) in FIG. 9B shows the delay time (hereinafter referred to as output delay time) tf of the fall of the output signal of the comparator Cmp. Here, part (i) in FIG. 9B shows a graph when the input voltage Vin has risen. In part (ii) in FIG. 9B, the horizontal axis represents the output delay time tf, and the vertical axis represents the output voltage Vout, which is the output signal. Further, part (i) in FIG. 9C shows the input voltage Vin, and part (ii) in FIG. 9C shows the delay time (hereinafter referred to as input delay time) tr of the rise of the output signal of the comparator Cmp. Here, part (i) in FIG. 9C shows a graph when the input voltage Vin has fallen. Further, in part (ii) in FIG. 9C, the horizontal axis represents the output delay time tr, and the vertical axis represents the output voltage Vout, which is the output signal.

Part (ii) in FIG. 9B and part (ii) in FIG. 9C show graphs in which the overdrive voltage Vod is set at 5 mV (@Vod=5 mV), 20 mV (@Vod=20 mV), and 100 mV (@Vod=100 mV). Further, part (ii) in FIG. 9B and part (ii) in FIG. 9C show graphs in which the delay times when the overdrive voltage Vod is set at 100 mV are tf1 and tr1, the delay times when the overdrive voltage Vod is set at 20 mV are tf2 and tr2, and the delay times when the overdrive voltage Vod is set at 5 mV are tf3 and tr3. From FIGS. 9B and 9C, it can be seen that the output delay time tr and the output delay time tf are shorter when the overdrive voltage Vod is larger, and conversely are longer when the overdrive voltage Vod is shorter. In other words, the relationships tf1<tf2<tf3 and tr1<tr2<tr3 each hold for the output delay times tf and tr.

In the related-art DC/DC converter illustrated in FIG. 8C, the threshold voltage change amounts $\Delta V_1$ and $\Delta V_2$ of the comparator Cmp correspond to the overdrive voltage Vod. As described above, in Expressions (15) and (16), the switching frequency fs can be increased by setting the threshold voltage change amounts $\Delta V_1$ and $\Delta V_2$ of the comparator Cmp to smaller values. However, when the response characteristics of the comparator Cmp are considered, setting the threshold voltage change amounts $\Delta V_1$ and $\Delta V_2$ of the comparator Cmp to smaller values in order to increase the switching frequency fs results in the overdrive voltage Vod decreasing. In addition, as described with reference to FIGS. 9A to 9C, when the overdrive voltage Vod is decreased, the output delay times tf and tr increase, the switching period Ts increases, and the switching frequency fs decreases.

Next, a first embodiment according to the present invention is described.

[Power Supply Apparatus Configuration and Operation]

Figure 1:
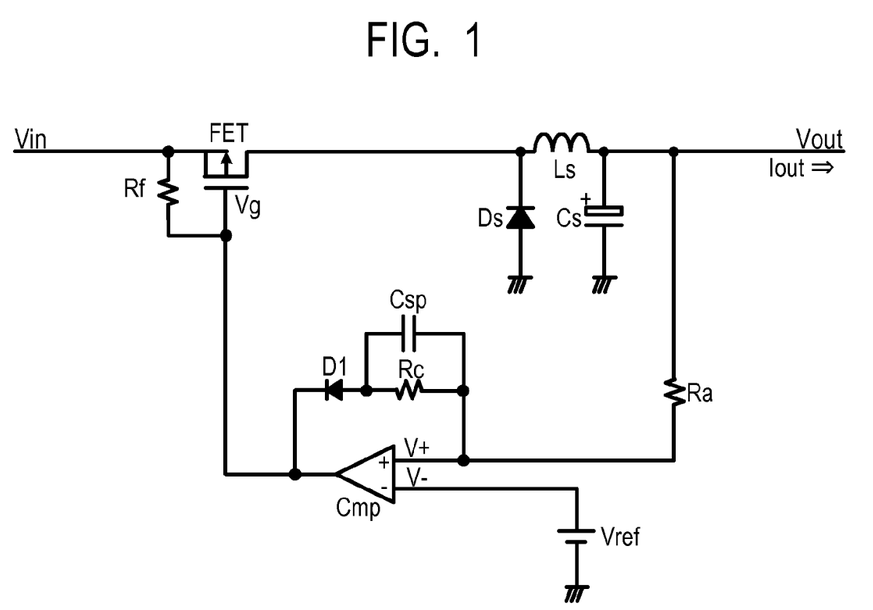
FIG. 1 illustrates a power supply apparatus according to a first embodiment of the present invention.

FIG. 1 illustrates a configuration of a DC/DC converter, which is the power supply apparatus according to the first embodiment. Parts having the same configuration as in FIG. 7 are denoted using the same reference symbols, and a description thereof is omitted here. In the power supply apparatus according to this embodiment, compared to the related-art power supply apparatus, a capacitor Csp is connected in parallel to the positive feedback resistor Rc. Further, FIGS. 2A to 2D, which illustrate operating waveforms of the DC/DC converter illustrated in FIG. 1, correspond to FIGS. 8A to 8D, and hence only the points different to FIG. 8C are described here.

When the FET switches on at time t90, the drain voltage of the FET is roughly the same as the input voltage Vin, the drain current Id flows, and the output voltage Vout increases. When the output voltage Vout increases, the voltage of the V+ terminal of the comparator Cmp also increases with the increase in the output voltage Vout. In this embodiment, one end of the capacitor Csp is connected to the V+ terminal of the comparator Cmp. Consequently, the voltage of the V+ terminal of the comparator Cmp (solid line in FIG. 2C) increases along a charge curve of the capacitor Csp until charging of the capacitor Csp finishes (3τcg described below). Note that, the voltage of the V+ terminal of the comparator Cmp at times t90 to t91, which is indicated as the solid line in FIG. 8C, is indicated as the dotted line in FIG. 2C for comparison with the voltage of the V+ terminal of the comparator Cmp according to this embodiment. This is also the same for times t92 to t93 and times t94 to t95. Further, when the voltage of the V+ terminal of the comparator Cmp increases and reaches the reference voltage Vref, the output of the comparator Cmp has a high impedance.

Figure 2A:
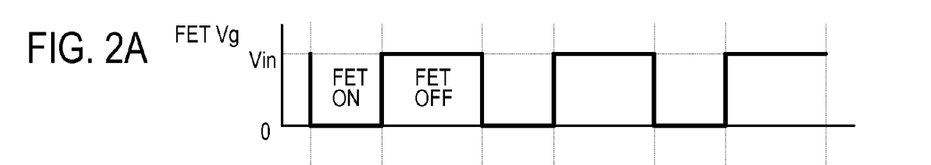
FIGS. 2A, 2B, 2C and 2D illustrate operating waveforms of the power supply apparatus according to the first embodiment.
Figure 2B:
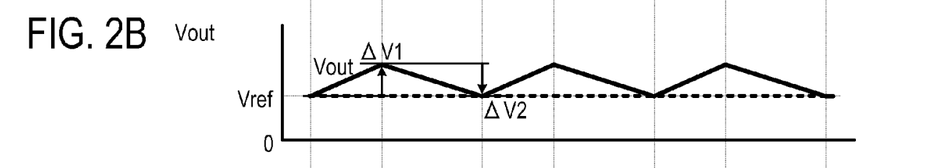
Figure 2C:
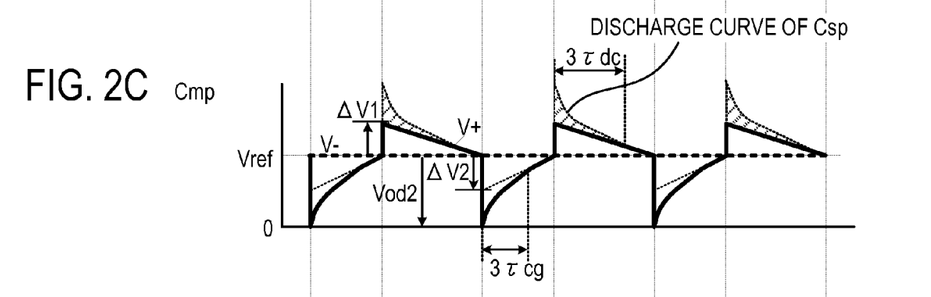
Figure 2D:
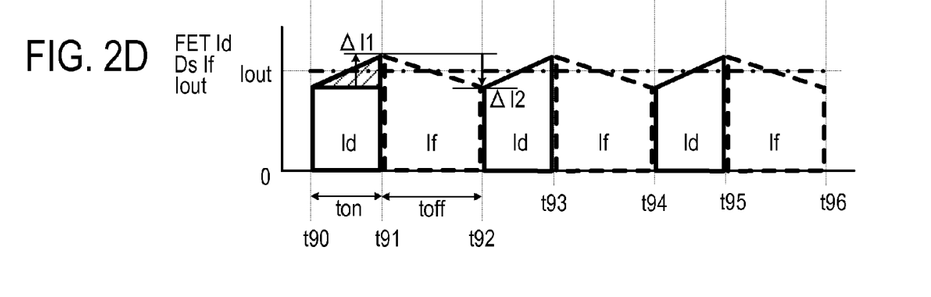

When the output of the comparator Cmp has a high impedance at time t91, a voltage in the reverse direction is applied to the diode D1. Therefore, the current that had been flowing until that point along the route output voltage Vout→detection resistor Ra→positive feedback resistor Rc→diode D1→output terminal (low level) of the comparator Cmp stops. Consequently, the voltage of the V+ terminal of the comparator Cmp increases by $\Delta V1$ from the reference voltage Vref. As described above, $\Delta V1$ is the increase in the voltage of the V+ terminal of the comparator Cmp by the positive feedback resistor Rc. $\Delta V1$ is roughly represented by Expression (21).

$$\Delta V_1 \cong \frac{V_{out}}{R_a + R_c} \cdot R_a \qquad (21)$$

In addition, based on the approximation in Expression (22), $\Delta V1$ is roughly represented by Expression (23).

$$V_{out} \cong V_{ref} \qquad (22)$$

$$\Delta V_1 \cong \frac{V_{ref}}{R_a + R_c} \cdot R_a \qquad (23)$$

When the voltage of the V+ terminal of the comparator Cmp increases from the reference voltage Vref by $\Delta V1$, the output of the comparator Cmp keeps a high impedance, and the FET maintains an off state. Due to the FET maintaining an off state, the voltage of the output voltage Vout decreases. When the voltage of the output voltage Vout decreases, the voltage of the V+ terminal of the comparator Cmp also decreases with the decrease in the output voltage Vout. Note that, in FIG. 2C, the voltage of the terminal on the left side of the capacitor Csp at times t91 to t92 is indicated by the dotted line. The dotted line represents a discharge curve of the capacitor Csp. Here, the terminal on the left side of the capacitor Csp refers to the terminal of the capacitor Csp that is on the side connected to the connection point between the diode D1 and the resistor Rc.

At time t92 in FIG. 2C, when the voltage of the V+ terminal of the comparator Cmp decreases and reaches the reference voltage Vref, the output of the comparator Cmp is at a low level, and the FET switches on again. When the FET switches on again, a voltage is applied in the forward direction to the diode D1, and a current flows along the route output voltage Vout→resistor Ra→capacitor Csp→diode D1→output terminal (low level) of the comparator Cmp. At this point, when the initial charge voltage of the capacitor Csp is taken as zero, as illustrated in FIG. 2C, the voltage of the V+ terminal of the comparator Cmp decreases to almost zero from the reference voltage Vref. Therefore, in this embodiment, an overdrive voltage Vod2 of the comparator Cmp is about the same as the reference voltage Vref. At this point, because the voltage of the V+ terminal of the comparator Cmp decreases to almost zero from the reference voltage Vref, it is desired that the capacitance of the capacitor Csp be as large as possible.

In the related-art DC/DC converter illustrated in FIG. 7, the overdrive voltage Vod at time t92 is the threshold voltage change amount $\Delta V2$. On the other hand, in this embodiment, the overdrive voltage Vod can be set to the overdrive voltage Vod2 (reference voltage Vref), which is larger than the threshold voltage change amount $\Delta V2$. Here, when the threshold voltage change amount $\Delta V2$, which is the related-art overdrive voltage Vod, is taken as a correction amount by the positive feedback resistor Rc, which is a correction unit, the capacitor Csp according to this embodiment functions as an increasing unit for increasing the overdrive voltage Vod to the overdrive voltage Vod2 (=Vref>$\Delta V2$), namely, an increasing unit for increasing the correction amount.

As described with reference to FIGS. 9A to 9C, the delay time of the output signal with respect to the input signal of the comparator Cmp is shorter when the overdrive voltage Vod is larger. Consequently, the output delay times tr and tf can be shortened by the overdrive voltage Vod2 (reference voltage Vref), which is larger than the related-art overdrive voltage Vref (threshold voltage change amount $\Delta V2$, which is a predetermined value) (Vod2>Vod). Further, shortening the delay time of the output signal with respect to the input signal of the comparator Cmp enables the switching period Is to be shortened and the switching frequency fs to be increased. Consequently, the switching frequency fs of the DC/DC converter can be increased, the size of the inductor Ls and the capacitor Cs can be reduced, and lower costs can be realized.

[Capacitance of Capacitor Csp]

An example of the method for setting the capacitance of the capacitor Csp is now described. The capacitor Csp is charged by a current flowing along the route output voltage Vout→detection resistor Ra→capacitor Csp→diode D1→output terminal (low level) of the comparator Cmp. A time constant Tcg of the charging of the capacitor Csp is roughly represented by Expression (24).

$$\tau_{cg} \cong C_{sp} \cdot R_a \qquad (24)$$

Further, the time from start to finish of charging of the capacitor Csp is typically approximated as about three times the time constant. Therefore, a time $3\tau cg$ from start to finish of the charging of the capacitor Csp is roughly represented by Expression (25).

$$3 \cdot \tau_{cg} \cong 3 \cdot C_{sp} \cdot R_a \qquad (25)$$

Here, to prevent the on time $t_{on}$ of the FET from being affected by the time $3\tau cg$ from start to finish of charging of the capacitor Csp, it is desired that the time $3\tau cg$ be shorter than the on time $t_{on}$ of the FET. Therefore, Expression (26) holds from Expressions (25) and (10).

$$3\tau_{cg} \cong 3 \cdot C_{sp} \cdot R_a \leq t_{on} \cong \sqrt{\frac{2 \cdot L_s \cdot C_s \cdot \Delta V_1}{V_{in} - V_{ref}}} \qquad (26)$$

Based on Expression (26), it is desired that the capacitor Csp satisfy Expression (27).

$$C_{sp} \leq \sqrt{\frac{2 \cdot L_s \cdot C_s \cdot \Delta V_1}{9 \cdot R_a^2 \cdot (V_{in} - V_{ref})}} \qquad (27)$$

When the voltage of the V+ terminal of the comparator Cmp decreases at time t92 from the reference voltage Vref, the output of the comparator Cmp keeps a low level, and the FET maintains an on state. When the FET is on, the drain voltage of the FET is roughly the same as the input voltage Vin, and the drain current Id flows. Consequently, the output voltage Vout increases. When the output voltage Vout increases, the voltage of the V+ terminal of the comparator Cmp also increases with the increase in the output voltage Vout.

When the voltage of the V+ terminal of the comparator Cmp increases and reaches the reference voltage Vref at time t93, the output of the comparator Cmp has a high impedance. Because the output of the comparator Cmp is pulled up by the resistor Rf, the FET switches off. Further, when the output of the comparator Cmp is at a high impedance, the current that had been flowing until that point along the route output voltage Vout→resistor Ra→positive feedback resistor Rc→diode D1→output terminal (low level) of the comparator Cmp stops. Note that, this route along which the current flows satisfies Expressions (26) and (27), and hence is a route after the charging of the capacitor Csp has finished. Consequently, the charge charged in the capacitor Csp is discharged via the resistor Rc. The time constant τdc of the discharging of the capacitor Csp is roughly represented by Expression (28).

$$\tau_{dc} \cong C_{sp} \cdot R_c \tag{28}$$

Further, the time from start to finish of discharging of the capacitor Csp is typically approximated as about three times the time constant. Therefore, a time 3τdc from start to finish of the discharging of the capacitor Csp is roughly represented by Expression (29).

$$3 \cdot \tau_{dc} \cong 3 \cdot C_{sp} \cdot R_c \tag{29}$$

Here, it is desired that the time 3τdc from start to finish of discharging of the capacitor Csp be shorter than the off time $t_{off}$ of the FET. Therefore, Expression (30) holds from Expressions (29) and (14).

$$3\tau_{dc} \cong 3 \cdot C_{sp} \cdot R_c \le t_{off} \cong \sqrt{\frac{2 \cdot L_s \cdot C_s \cdot \Delta V_2}{V_{ref}}} \tag{30}$$

Therefore, it is desired that the capacitor Csp satisfy Expression (31).

An example of the method for setting the capacitance of the capacitor Csp has been described above. Note that, the method for setting the capacitance of the capacitor Csp is not limited to the above-mentioned method.

$$C_{sp} \le \sqrt{\frac{2 \cdot L_s \cdot C_s \cdot \Delta V_2}{9 \cdot R_c^2 \cdot V_{ref}}} \tag{31}$$

[Power Supply Apparatus Modified Example]

Figure 3:
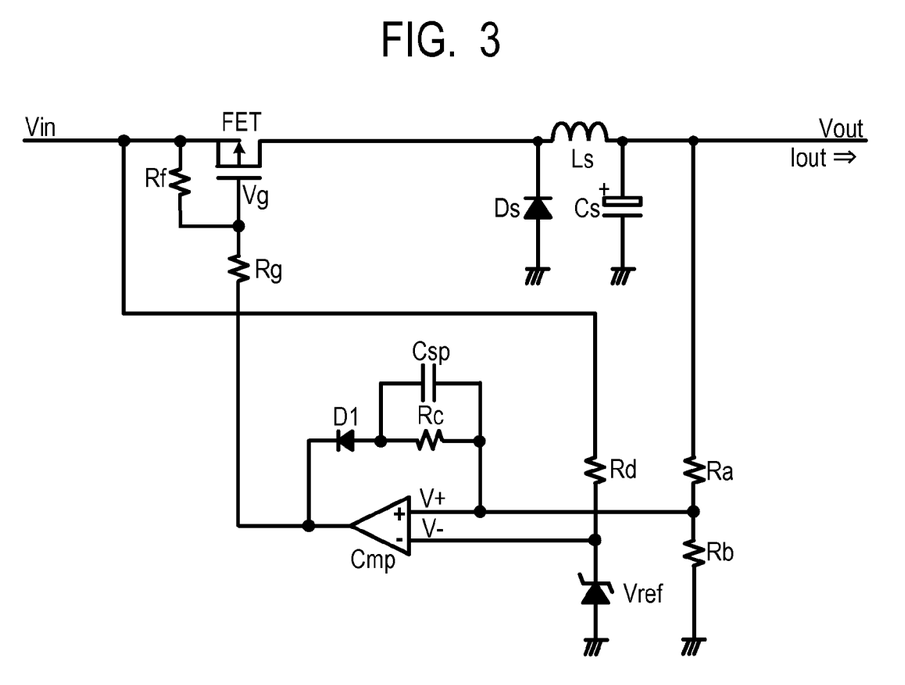
FIG. 3 illustrates the power supply apparatus according to the first embodiment.

The power supply apparatus illustrated in FIG. 1 may be a power supply apparatus like that illustrated in FIG. 3. For example, a gate resistor Rg may be connected to the gate terminal Vg of the FET. Further, the reference voltage input to the V− terminal of the comparator Cmp may be generated by a resistor Rd and a Zener diode Vref. In this case, one end of the resistor Rd is connected to the input voltage Vin, and the other end of the resistor Rd is connected to the cathode side of the Zener diode. Further, the anode side of the Zener diode is grounded. In addition, the voltage input to the V+ terminal of the comparator Cmp may also be a voltage obtained by dividing the output voltage Vout with the detection resistor Ra and a voltage-dividing resistor Rb. Still further, parts having the same configuration as the power supply apparatus illustrated in FIG. 1 are denoted using the same reference symbols, and a description thereof is omitted here. Note that, the operating waveforms of the power supply apparatus illustrated in FIG. 3 are the same as those illustrated in FIGS. 2A to 2D, and hence a description thereof is omitted here.

According to this embodiment, the switching frequency of the power supply apparatus can be increased, and the size and costs of the apparatus can be reduced.

Next, a second embodiment according to the present invention is described.

[Power Supply Apparatus Configuration and Operation]

Figure 4A:
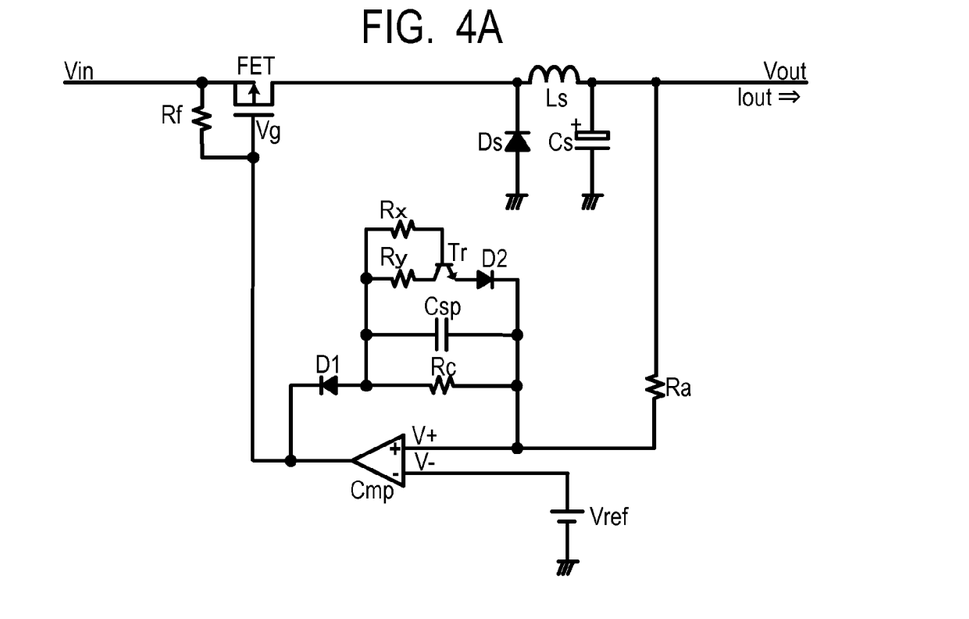
FIGS. 4A and 4B illustrate a power supply apparatus according to a second embodiment of the present invention.

FIG. 4A illustrates a DC/DC converter, which is the power supply apparatus according to the second embodiment. A characteristic of this embodiment is the provision of a forced discharge circuit of the capacitor Csp in the DC/DC converter according to the first embodiment described with reference to FIG. 1. This forced discharge circuit is configured from a resistor Rx, a resistor Ry, a transistor Tr, and a diode D2. Specifically, one end of the resistor Ry is connected to a collector terminal of the transistor Tr, and an emitter terminal of the transistor Tr is connected to the anode side of the diode D2. The resistor Ry, the transistor Tr, and the diode D2 are connected in parallel to the capacitor Csp. In other words, the other end of the resistor Ry is connected to one terminal of the capacitor Csp, and the cathode side of the diode D2 is connected to the other terminal of the capacitor Csp. Further, one end of the resistor Rx is connected to a base terminal of the transistor Tr, and the other end of the resistor Rx is connected to the other end of the resistor Ry. Note that, parts having the same configuration as in FIG. 1 are denoted using the same reference symbols, and a description thereof is omitted here.

As described above, the switching frequency fs can be increased by setting the threshold voltage change amounts ΔV1 and ΔV2 to smaller values (Expressions (15) and (16)). From Expression (6), it can be seen that to set the threshold voltage change amounts ΔV1 and ΔV2 to smaller values, it is desired to set so that the relationship between the detection resistor Ra and the positive feedback resistor Rc be like in Expression (41).

$$R_a << R_c \tag{41}$$

On the other hand, when the positive feedback resistor Rc is set to a large resistance value, the right side of Expression (31) decreases. As a result, because the relationship of Expression (31) holds, the capacitance of the capacitor Csp cannot be set to a desired value due to the decrease on the right side of Expression (31). If the capacitance of the capacitor Csp cannot be set to the desired value, at time t92 in FIGS. 2A to 2D, the voltage of the V+ terminal of the comparator Cmp cannot be reduced to almost zero. Consequently, because the overdrive voltage Vod2 of the comparator Cmp cannot be increased, the switching frequency fs of the DC/DC converter cannot be sufficiently increased. This embodiment solves this problem.

[Forced Discharge Circuit Operation]

Operation of the forced discharge circuit of the capacitor Csp configured from the resistor Rx, the resistor Ry, the transistor Tr, and the diode D2 is described with reference to FIGS. 5A to 5D. FIGS. 5A to 5D, which illustrate operating waveforms of the DC/DC converter illustrated in FIG. 4A, correspond to FIGS. 2A to 2D, and hence only the points different to FIGS. 2A to 2D are described here. At times t90 to t91, the output of the comparator Cmp is at a low level, and hence a voltage is applied in the reverse direction to the diode D2. Therefore, a base current does not flow to the transistor Tr, and the forced discharge circuit does not operate. Consequently, at times t90 to t91, operation is the same as in the first embodiment. On the other hand, when the output of the comparator Cmp has a high impedance at time t91, a voltage is applied in the reverse direction to the diode D1. Consequently, the charge charged in the capacitor Csp is discharged along the route capacitor Csp→resistor Rx→base terminal of the transistor Tr→emitter terminal of the transistor Tr→diode D2→capacitor Csp. This discharge current acts as the base current of the transistor Tr, and hence a collector current of the transistor Tr flows via the resistor Ry. At this stage, it is desired that the resistors Rx and Ry be set so that Expressions (42) and (43) are satisfied (in which the current amplification ratio of the transistor Tr is denoted as hfe).

$$R_y \leq \frac{R_x}{h_{fe}} \quad (42)$$

$$R_y \ll R_c \quad (43)$$

By providing a forced discharge circuit in which the resistors Rx and Ry satisfy Expressions (42) and (43), the charge charged in the capacitor Csp can be immediately discharged. As indicated at times t91 to t92, times t93 to t94, and times t95 to t96 of FIG. 5C, the time 3τdc according to this embodiment is shorter than the time 3τdc indicated in FIG. 2C of the first embodiment.

The time constant τdc of the discharge of the capacitor Csp by the forced discharge circuit is roughly represented by Expression (44).

$$\tau_{dc} \cong C_{sp} \cdot R_y \quad (44)$$

Further, the time from start to finish of discharging of the capacitor Csp is typically approximated as about three times the time constant. Therefore, the time 3τdc from start to finish of the discharging of the capacitor Csp is roughly represented by Expression (45).

$$3 \cdot \tau_{dc} \cong 3 C_{sp} \cdot R_y \quad (45)$$

Because Expression (45) holds, the discharge time of the capacitor Csp (time 3τdc) is unrelated to the magnitude of the positive feedback resistor Rc. Therefore, the capacitance of the capacitor Csp can be set to a large capacitance without the restriction of Expression (31) (expression in which the capacitance of the capacitor Csp depends on the resistance value of the positive feedback resistor Rc). Further, increasing the capacitance of the capacitor Csp allows the overdrive voltage Vod2 of the comparator Cmp to be set at a large voltage. In addition, as described in the first embodiment, setting the overdrive voltage Vod2 of the comparator Cmp to a large voltage allows the switching frequency fs of the DC/DC converter to be sufficiently increased. Consequently, the size and costs of the inductor Ls and the capacitor Cs can be reduced.

Figure 4B:
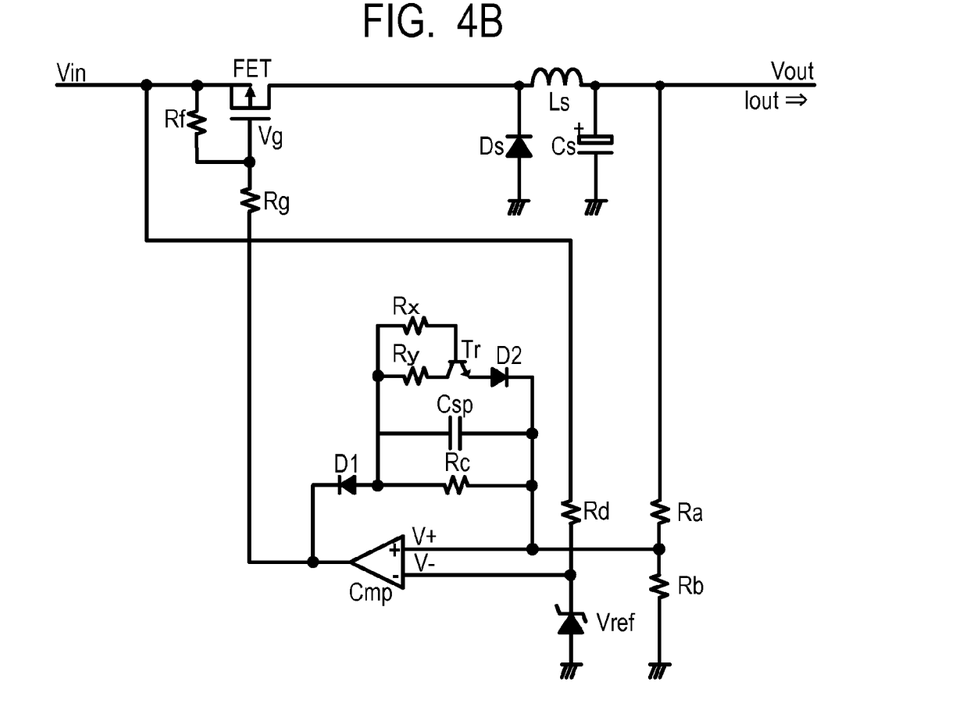
Figure 5A:
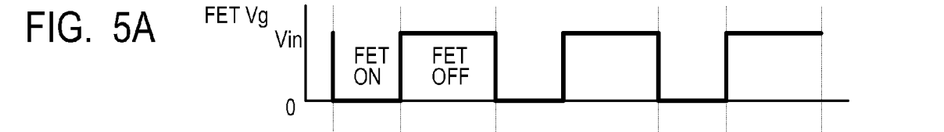
FIGS. 5A, 5B, 5C and 5D illustrate operating waveforms of the power supply apparatus according to the second embodiment.
Figure 5B:
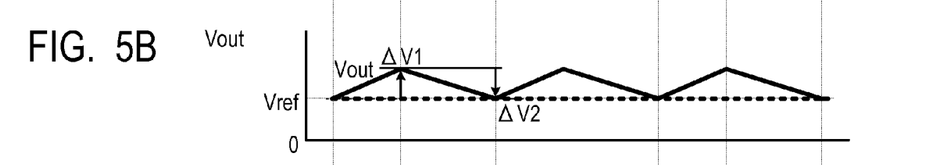
Figure 5C:
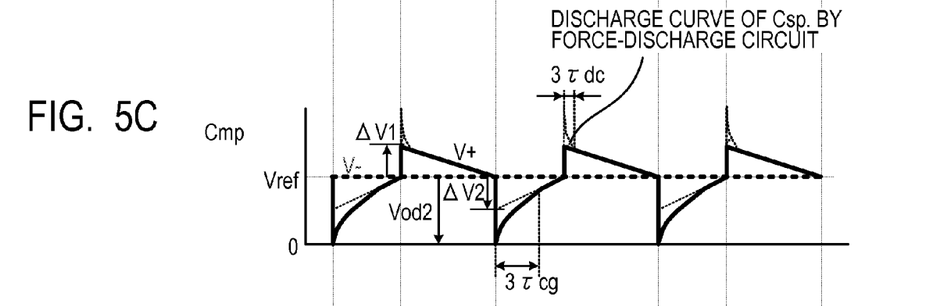
Figure 5D:
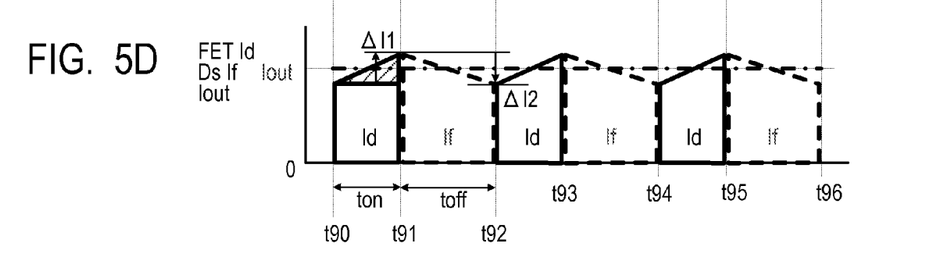

Note that, in this embodiment too, similar to the configuration described with reference to FIG. 3 in the first embodiment, the power supply apparatus may also be a power supply apparatus like that illustrated in FIG. 4B. Also note that, parts having the same configuration as in FIGS. 3 and 4A are denoted using the same reference symbols, and a description thereof is omitted here.

According to this embodiment, the switching frequency of the power supply apparatus can be increased, and the size and costs of the apparatus can be reduced.

Next, an application example of the power supply apparatus is described.

The power supply apparatus described in the first and second embodiments can be applied as, for example, a low-voltage power supply for an image forming apparatus, namely, a power supply configured to supply power to a driving unit, such as a controller (control unit), a motor, and the like. The configuration of the image forming apparatus in which the power supply apparatus according to the first and second embodiments is applied is described.

[Image Forming Apparatus Configuration]

Figure 6:
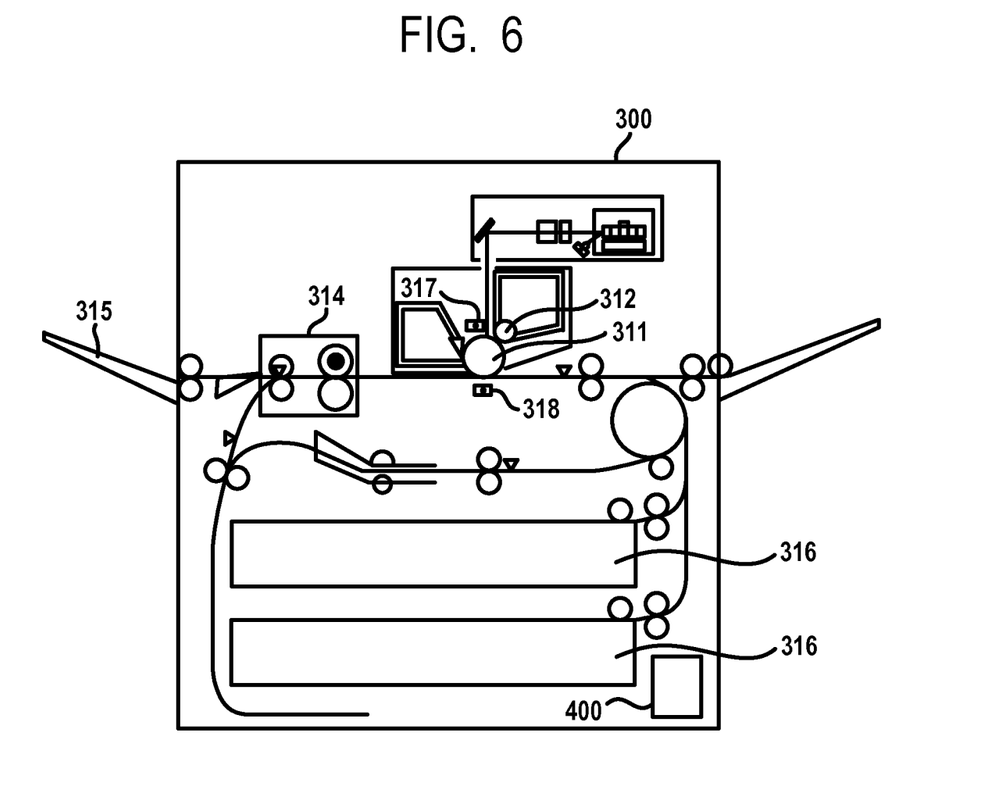
FIG. 6 illustrates a configuration of an image forming apparatus according to a third embodiment of the present invention.

A laser beam printer is described here as an example of the image forming apparatus. FIG. 6 illustrates a schematic configuration of a laser beam printer, which is an example of an electrophotographic printer. A laser beam printer 300 includes a photosensitive drum 311 as an image bearing member on which an electrostatic latent image is formed, a charging portion 317 (charging unit) configured to uniformly charge the photosensitive drum 311, and a developing portion 312 (developing unit) configured to develop the electrostatic latent image formed on the photosensitive drum 311 with toner. The toner image developed on the photosensitive drum 311 is transferred by a transfer portion 318 (transfer unit) onto a sheet (not shown) as a recording medium fed from a cassette 316. The toner image transferred onto the sheet is fixed by a fixing device 314, and then delivered to a tray 315. The photosensitive drum 311, the charging portion 317, the developing portion 312, and the transfer portion 318 serve as an image forming unit. Further, the laser beam printer 300 includes a power supply apparatus 400 according to the first and second embodiments. Note that, the image forming apparatus in which the power supply apparatus 400 according to the first and second embodiments can be applied is not limited to the example illustrated in FIG. 6. For example, the image forming apparatus may include a plurality of image forming units. Further, the image forming apparatus may also include a primary transfer portion configured to transfer the toner image on the photosensitive drum 311 onto an intermediate transfer belt, and a secondary transfer portion configured to transfer the toner image on the intermediate transfer belt onto the sheet.

The laser beam printer 300 includes a controller (not shown) configured to control an image forming operation carried out by the image forming unit and a conveyance operation of the sheet. The power supply apparatus 400 according to the first and second embodiments is configured to supply power to the controller, for example. Further, the power supply apparatus 400 according to the first and second embodiments is configured to supply power to a driving unit, such as a motor, for driving various rollers configured to rotate the photosensitive drum 311 or convey the sheet. The image forming apparatus according to this embodiment includes the power supply apparatus 400 according to the first and second embodiments, and hence is capable of increasing the switching frequency fs of the FET.

According to this embodiment, the switching frequency of the power supply apparatus mounted on the image forming apparatus can be increased, and the size and costs of the apparatus can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022545, filed on Feb. 7, 2014, which is hereby incorporated by reference herein in its entirety.

What is claimed is:

1. A DC/DC converter comprising:
    a switching element connected to a signal line to which a first DC voltage is supplied;
    an inductor connected to the switching element, the inductor configured to generate a second DC voltage lower than the first DC voltage by switching operation of the switching element;
    a detection unit configured to detect the second DC voltage;
    a comparator configured to compare the second DC voltage detected by the detection unit with a reference voltage;
    a voltage correction unit including a diode and a resister connected to the diode in series, the voltage correction unit connected to an output side of the comparator and an input side of the comparator to which the second DC voltage is input, wherein the voltage correction unit is configured to correct the second DC voltage detected by the detection unit;

a voltage increasing unit including a capacitor, the voltage increasing unit connected to the resister of the voltage correction unit in parallel so as to increase a correction amount of the voltage correction unit.

2. The DC/DC converter according to claim 1, wherein the voltage increasing unit is configured to increase the correction amount when the switching element switches from off to on.

3. The DC/DC converter according to claim 1,
wherein the comparator includes an output terminal connected to a control terminal of the switching element.

4. The DC/DC converter according to claim 3, wherein a time from start to finish of discharging of the capacitor is determined based on a resistance value of the resistor.

5. The DC/DC converter according to claim 3, further comprising a discharge unit configured to discharge a charge charged in the capacitor.

6. The DC/DC converter according to claim 5,
wherein the discharge unit comprises:
a second diode in which a cathode side is connected to one end of the capacitor;
a transistor having an emitter terminal connected to an anode side of the second diode;
a second resistor having one end connected to a collector terminal of the transistor, and another end connected to another end of the capacitor; and
a third resistor having one end connected to a base terminal of the transistor, and another end connected to the another end of the second resistor.

7. The DC/DC converter according to claim 6, wherein a time from start to finish of discharging of the capacitor is determined based on a resistance value of the second resistor.

8. The DC/DC converter according to claim 3, wherein a time from start to finish of charging of the capacitor is shorter than an on time of the switching element.

9. The DC/DC converter according to claim 3, wherein a time from start to finish of discharging of the capacitor is shorter than an off time of the switching element.

10. The DC/DC converter according to claim 3,
wherein the correction amount comprises an overdrive voltage value of the comparator, and
wherein the voltage increasing unit is configured to increase the overdrive voltage value based on the operation of the switching element when the switching element switches from off to on.

11. An image forming apparatus comprising:
an image forming unit;
a control unit configured to control operation of the image forming unit; and
a DC/DC converter configured to supply power to the control unit,
the DC/DC converter comprising:
a switching element connected to a signal line to which a first DC voltage is supplied;
an inductor connected to the switching element, the inductor configured to generate a second DC voltage lower than the first DC voltage by switching operation of the switching element;
a detection unit configured to detect the second DC voltage;
a comparator configured to compare the second DC voltage detected by the detection unit with a reference voltage;
a voltage correction unit including a diode and a resister connected to the diode in series, the voltage correction unit connected to an output side of the comparator and an input side of the comparator to which the second DC voltage is input, wherein the voltage correction unit is configured to correct the second DC voltage detected by the detection unit;
a voltage increasing unit including a capacitor, the voltage increasing unit connected to the resister of the voltage correction unit in parallel so as to increase a correction amount of the voltage correction unit.

12. The image forming apparatus according to claim 11, further comprising a driving unit configured to drive the image forming unit,
wherein the DC/DC converter supplies power to the driving unit.

* * * * *